(12) United States Patent
Wu et al.

(10) Patent No.: US 7,190,431 B2
(45) Date of Patent: Mar. 13, 2007

(54) METHOD FOR CURING SEALANT USED WHEN SEALING AN LCD PANEL

(75) Inventors: Jia-Yi Wu, Miao-Li (TW); Chueh-Ju Chen, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 11/173,374

(22) Filed: Jun. 30, 2005

(65) Prior Publication Data

US 2006/0152669 A1    Jul. 13, 2006

(30) Foreign Application Priority Data

Jul. 9, 2004    (TW) ............................... 93120648 A

(51) Int. Cl.
*G02F 1/1339*    (2006.01)

(52) U.S. Cl. ...................................... 349/190; 349/153

(58) Field of Classification Search ................ 349/153, 349/187, 190; 430/5, 6, 7, 20, 321
See application file for complete search history.

(56) References Cited

FOREIGN PATENT DOCUMENTS

| JP | 2003-057661 | * | 2/2003 |
|---|---|---|---|
| TW | 526367 | | 4/2003 |

* cited by examiner

*Primary Examiner*—Toan Ton
*Assistant Examiner*—Tai Duong
(74) *Attorney, Agent, or Firm*—Wei Te Chung

(57) ABSTRACT

A method for manufacturing a liquid crystal display panel includes: providing a first substrate (110), and forming a color filter film (410) and a black matrix (310) on the first substrate; providing a second substrate (210), and applying a sealant (710) on the second substrate; applying liquid crystal onto the second substrate; attaching the first substrate to the second substrate; and curing the sealant by applying light having a diffraction pattern.

6 Claims, 4 Drawing Sheets

METHOD FOR CURING SEALANT USED WHEN SEALING AN LCD PANEL

BACKGROUND OF THE INVENTION

1. Field of the Invention

The present invention relates to a method for manufacturing a liquid crystal display (LCD), and especially to a method for curing a sealant of an LCD panel.

2. General Background

A liquid crystal display panel generally comprises two glass substrates, a peripheral sealant, and liquid crystal. The sealant is printed on one of the glass substrates, and is then adhered to the other glass substrate. The substrates and the sealant cooperatively form a space therebetween, and then the liquid crystal is filled into the space.

There are generally two methods used for filling the liquid crystal into the space. The first method is to fill the liquid crystal through filling ports. This method comprises the following steps: firstly, printing a sealant on a first glass substrate, wherein the sealant is rectangular and has one or more gaps that function as filling ports; secondly, combining a second glass substrate with the first glass substrate and curing the sealant, wherein a space is enclosed by the sealant and the two glass substrates; thirdly, immersing the filling ports in liquid crystal in a vacuum chamber; and finally, introducing gas into the vacuum chamber to make the liquid crystal fill up the space.

The second method is the so-called one-drop-fill (ODF) method. This method comprises the following steps: firstly, printing a sealant on a first glass substrate, wherein the sealant is rectangular and continuous, and a space is enclosed by the sealant and the first glass substrate; secondly, putting liquid crystal into the space drop by drop using a dispenser; and finally, combining a second glass substrate with the first glass substrate and curing the sealant. The ODF method can save much time and liquid crystal material, especially in a large size liquid crystal display panel manufacturing process.

Referring to FIG. 8, a conventional liquid crystal display panel 1 includes a first glass substrate 10, a second glass substrate 20 opposite from the first glass substrate 10, liquid crystal 50 sealed between the first substrate 10 and the second substrate 20, and a sealant 70 for sealing the first substrate 10 and the second substrate 20. A photo resist 40 and a black matrix 30 are arranged on an inner surface of the first substrate 10.

Referring to FIG. 9 and FIG. 10, a method for adhering the two substrates 10, 20 comprises the follow steps: firstly, providing the first substrate 10 and the second substrate 20 on a worktable 80, forming a photo resist 40 and a black matrix 30 on the first substrate 10, and then printing a sealant 70 on the first substrate 10, wherein the sealant 70 is rectangular and continuous; secondly, putting liquid crystal 50 on the second substrate 20 drop by drop using a dispenser; thirdly, aligning and combining the first substrate 10 and the second substrate 20 in a vacuum chamber; finally, curing the sealant 70 by applying ultraviolet (UV) light, whereby the first substrate 10 and the second substrate 20 are securely attached to each other. A liquid crystal display panel 1 is thus obtained.

However, during the process of curing the sealant 70 by applying the UV light, a part (indicated with A) of the sealant 70 is blocked by the black matrix 30, whereby the sealant 70 cannot be completely cured by the UV light. In addition, because the liquid crystal 50 directly contacts the sealant 70, some of the uncured sealant 70 may get mixed with the neighboring liquid crystal 50. Therefore, a uniform performance of the liquid crystal display panel 1 may be impaired. Furthermore, even though the part A of the sealant 70 is not blocked by the black matrix 30, a light intensity of the UV light incident on a side of the first substrate 10 is generally unduly low and not enough to cause the sealant 70 to be completely cured.

What is needed, therefore, is a method for curing sealant that can improve the performance of a liquid crystal display panel as regards a uniformity of display quality. What is also needed is an LCD panel manufacturing method that can yield a liquid crystal display panel having improved uniformity of display quality.

SUMMARY

In one preferred embodiment, a method for curing a sealant when sealing a liquid crystal display panel, the method includes: providing the liquid crystal display panel with a sealant for sealing the liquid crystal display panel and curing the sealant by applying light having a diffraction pattern.

In another preferred embodiment, a method for manufacturing a liquid crystal display panel includes: providing a first substrate, and forming a color filter film and a black matrix on the first substrate; providing a second substrate, and applying a sealant on the second substrate; applying liquid crystal onto the second substrate; attaching the first substrate to the second substrate; and curing the sealant by applying light having a diffraction pattern.

Other advantages and novel features will become more apparent from the following detailed description of preferred embodiments when taken in conjunction with the accompanying drawings, in which:

DETAILED DESCRIPTION OF PREFERRED EMBODIMENTS

Reference will now be made to the drawings to describe the preferred embodiments in detail.

Figure 1:
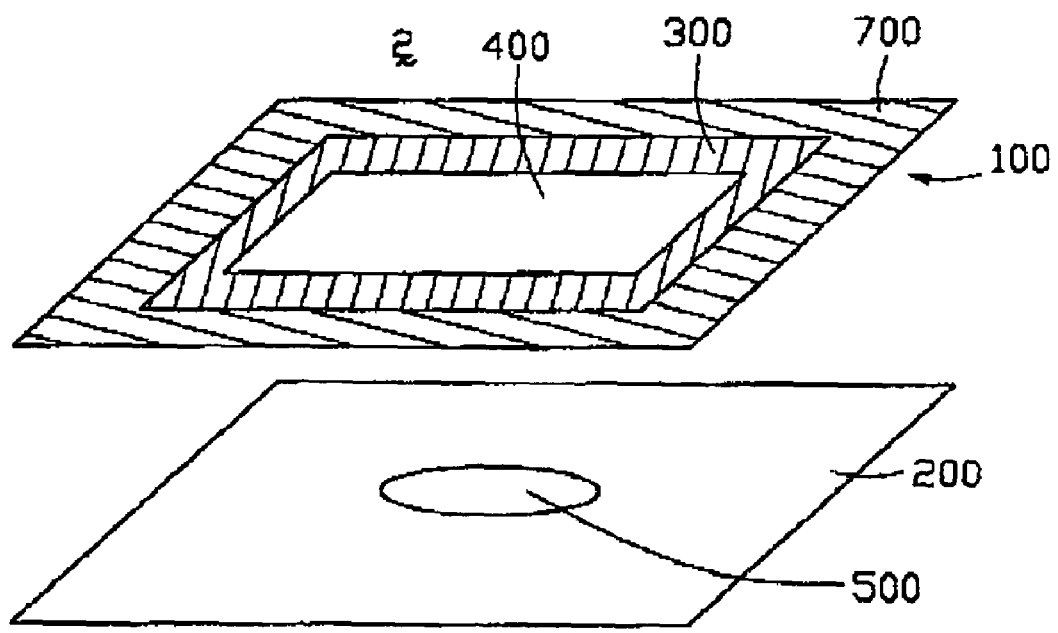
FIG. 1 is a simplified, schematic isometric view showing one stage in a method for manufacturing a liquid crystal display panel according to a first embodiment of the present invention.
Figure 2:
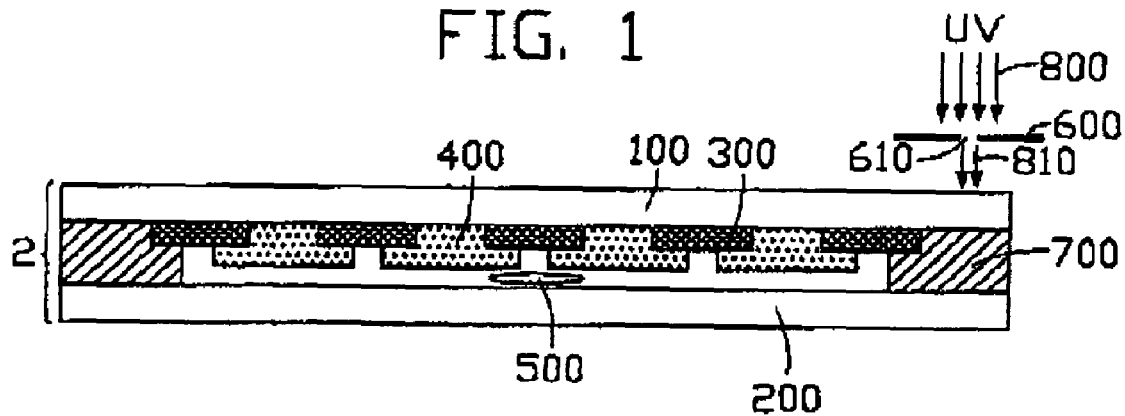
FIG. 2 is a simplified, schematic, side cross-sectional view showing another stage in the method according to the first embodiment, namely curing a sealant of the liquid crystal display panel.

Referring to FIG. 1 and FIG. 2, a method for manufacturing a liquid crystal display panel 2 in accordance with a first embodiment comprises the following steps. Firstly, a first substrate 100 is prepared. A black matrix 300 is formed on a display area of the first substrate 100 for preventing red, green and blue (RGB) photo resists from mixing. Secondly, a color filter film 400 is formed by repeatedly performing processes of coating, exposing and developing the RGB photo resists. Thirdly, a sealant 700 is applied on the first substrate 100 by a printing method. The sealant 700 is applied continuously such that the applied sealant 700 constitutes four sides of a rectangle. Fourthly, a second substrate 200 is prepared. Liquid crystal 500 is applied drop by drop on the second substrate 200. Fifthly, the first substrate 100 is aligned with and attached to the second substrate 200 in a vacuum chamber. Sixthly, a UV light source 800 is disposed above the substrates 100 and 200, spatially corresponding to the sealant 700. A mask 600 with a single slit 610 is disposed adjacent the UV light source 800 for producing a diffraction pattern. Finally, the sealant 700 of the liquid crystal display panel 2 is cured by a main maxima portion 820 of a diffraction light 810, whereby the substrates 100 and 200 are securely attached to each other by the cured sealant 700.

The mask 600 is interposed between the UV light source 800 and the sealant 700. A width of the slit 610 and a wavelength of the UV light of the UV light source 800 are selected such that the light of the main maxima portion 820 of the diffraction light 810 is incident on the sealant 700. The sealant 700 is thus cured, whereby the substrates 100 and 200 are firmly attached to each other.

Figure 3:
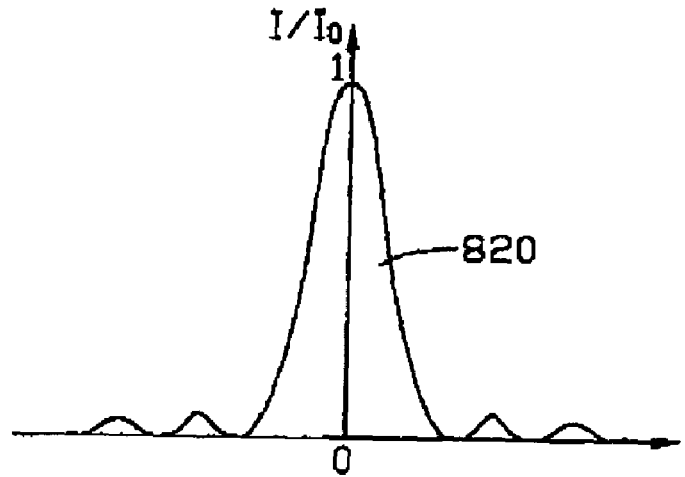
FIG. 3 is a diagram showing a distribution of light intensity in a single-slit diffraction, according to the first embodiment.

Referring to FIG. 3, a diffraction pattern of the diffraction light 810 includes the main maxima portion 820 having most of the light intensity of the light source. In the curing process, compared with conventional methods, the UV light is subjected to a single-slit diffraction using the mask 600. The resultant diffraction light 810 can thus effectively cause all the sealant 700, especially portions that are unreachable by the UV light and are uncured when curing by conventional methods, to completely cure. Therefore, the efficiency of utilization of UV light of the UV light source 800 is improved.

Figure 4:
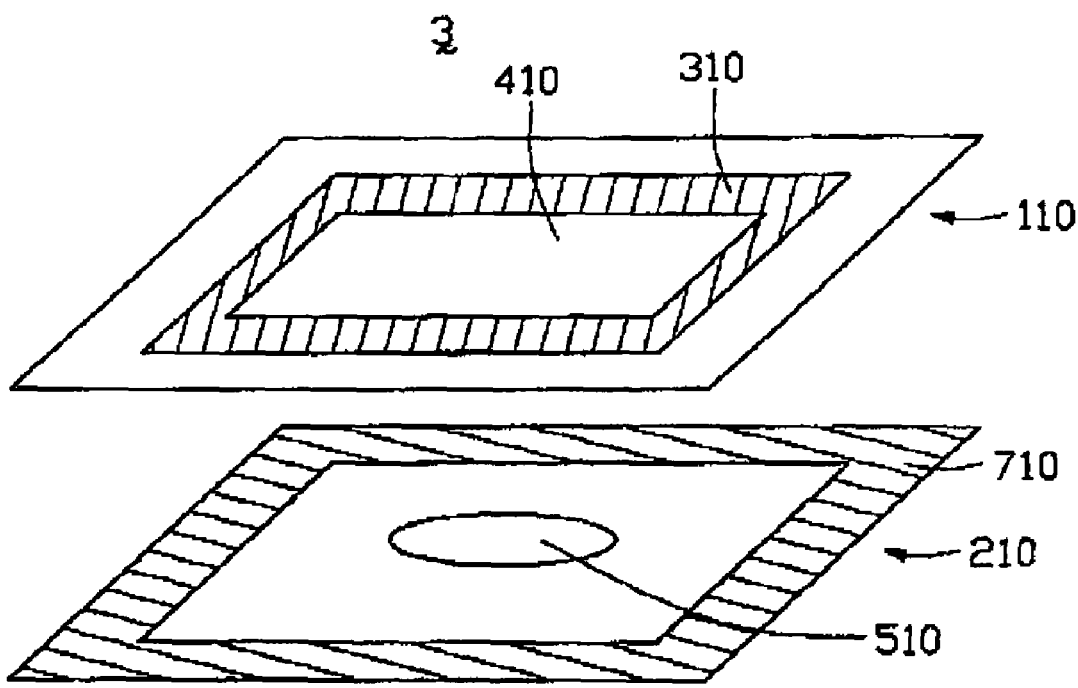
FIG. 4 is a simplified, schematic isometric view showing one stage in another method for curing a sealant of a liquid crystal display panel, according to a second embodiment of the present invention.
Figure 5:
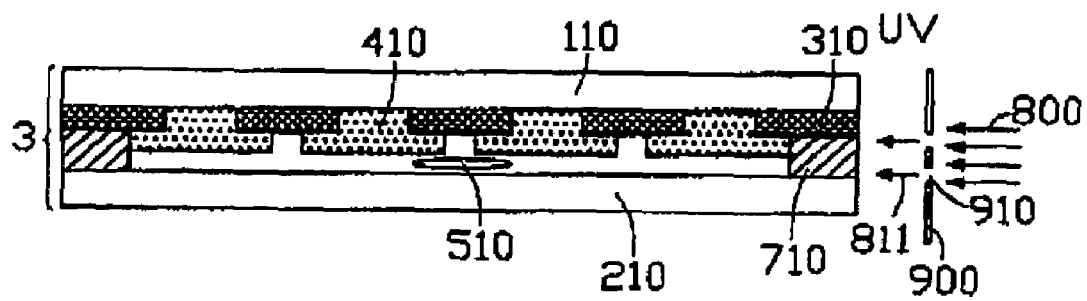
FIG. 5 is a simplified, schematic, side cross-sectional view showing another stage in the method according to the second embodiment.

Referring to FIG. 4 and FIG. 5, a method for manufacturing a liquid crystal display panel in accordance with another exemplary embodiment comprises the following steps. Firstly, a first substrate 110 is prepared. A black matrix 310 is formed on a display area of the first substrate 110 to prevent the RGB photo resists from mixing together. Secondly, a color filter film 410 is formed by repeatedly performing the processes of coating, exposing and developing RGB photo resists. Thirdly, a second substrate 210 is provided. A sealant 710 is formed on the second substrate 210 by a printing method. The sealant 710 is continuously applied such that the applied sealant 700 bounds a rectangular region on the second substrate 210. Liquid crystal 510 is applied drop by drop onto the rectangular region of the second substrate 210. Fourthly, the first substrate 110 is aligned with and attached to the second substrate 210 in a vacuum chamber. Fifthly, a UV light source 800 is disposed at a side of the substrates 110, 210, adjacent the sealant 710. A mask 900 with double slits 910 is oriented vertically and interposed between the UV light source 800 and the sealant 710, for producing a double-slit diffraction pattern. Finally, the sealant 710 of the liquid crystal display panel 3 is cured by applying diffraction light 811 of the double-slit diffraction pattern. Thereby, the substrates 110 and 210 are securely attached to each other.

In the illustrated embodiment, the UV light source 800 and the mask 900 are arranged in a different configuration from that of the first embodiment. The mask 900 is oriented vertically and disposed adjacent the sealant 710 of the semi-finished liquid crystal display panel 3. A width of each slit 910, a slit-to-slit distance, and a wavelength of UV light are selected such that light of a main maxima portion 821 of the diffraction light 811 is incident on the sealant 710, whereby the sealant 710 is cured.

Figure 6:
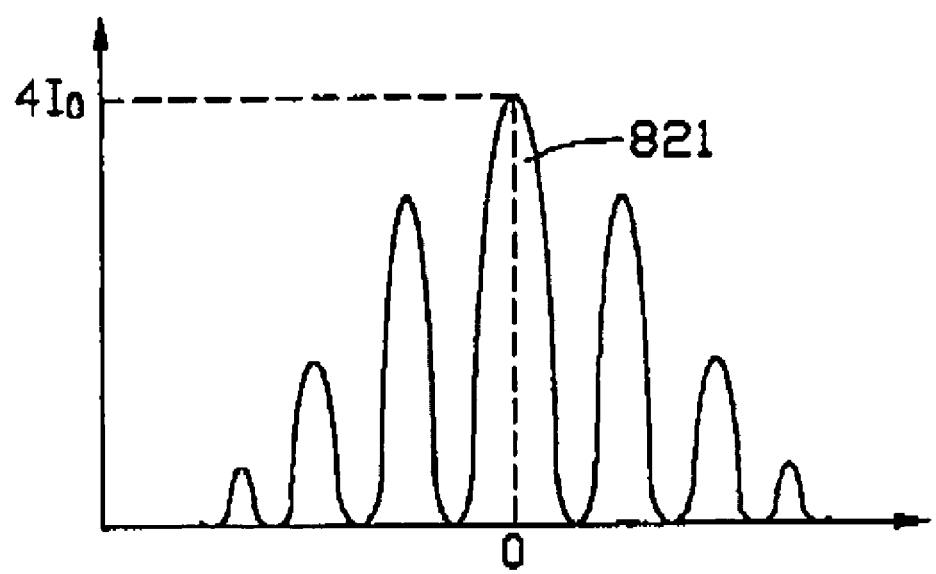
FIG. 6 is a diagram showing a distribution of light intensity in a double-slit diffraction, according to the second embodiment.

Referring to FIG. 6, a peak light intensity of the main maxima portion 821 of the diffraction light 811 is four times a light intensity of the UV light source 800. In the curing process, compared with conventional methods, the UV light is subjected to a double-slit diffraction using the mask 900. The resultant diffraction light 811 can thus effectively cause all the sealant 710, especially potions that are unreachable by the UV light and are uncured by way of conventional methods, to completely cure. Therefore, the efficiency of utilization of UV light of the UV light source 800 is improved.

In other exemplary embodiments, the positions of the UV light source 800 and the masks 600, 900 can be adjusted according to need, as long as the main maxima portion of the diffraction light can be incident on the sealant 700, 710 for curing the sealant 700, 710. An incident angle of the UV light relative to the slits 910 of the mask 900 can also be adjusted, as long as the main maxima portion of the diffraction light can be incident on the sealant 700, 710. The UV light can also be substituted with infrared light.

Figure 7:
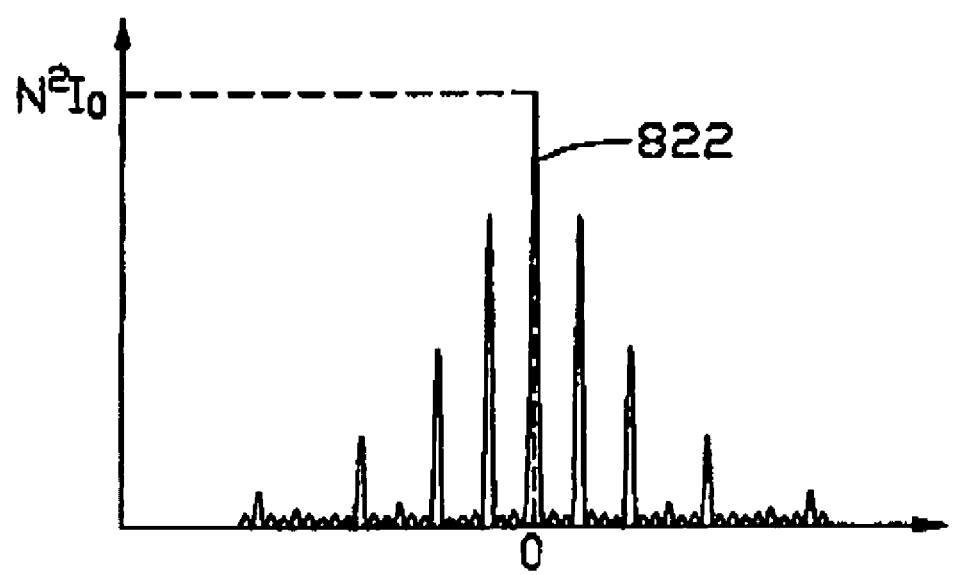
FIG. 7 is a diagram showing a distribution of light intensity in an n-slit diffraction, according to another embodiment of the present invention.
Figure 8:
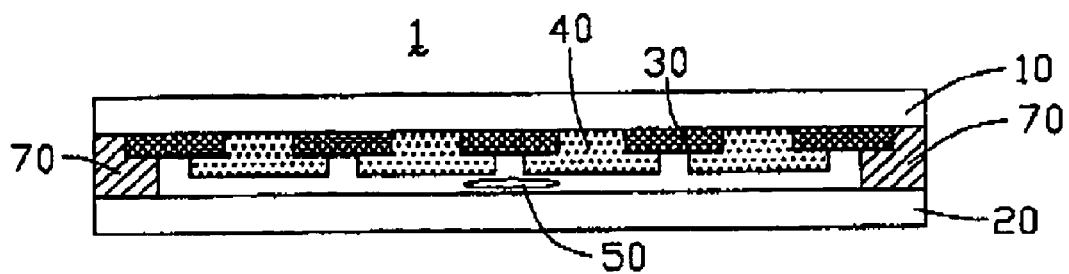
FIG. 8 is a simplified, schematic, side cross-sectional view of a conventional liquid crystal display panel.
Figure 9:
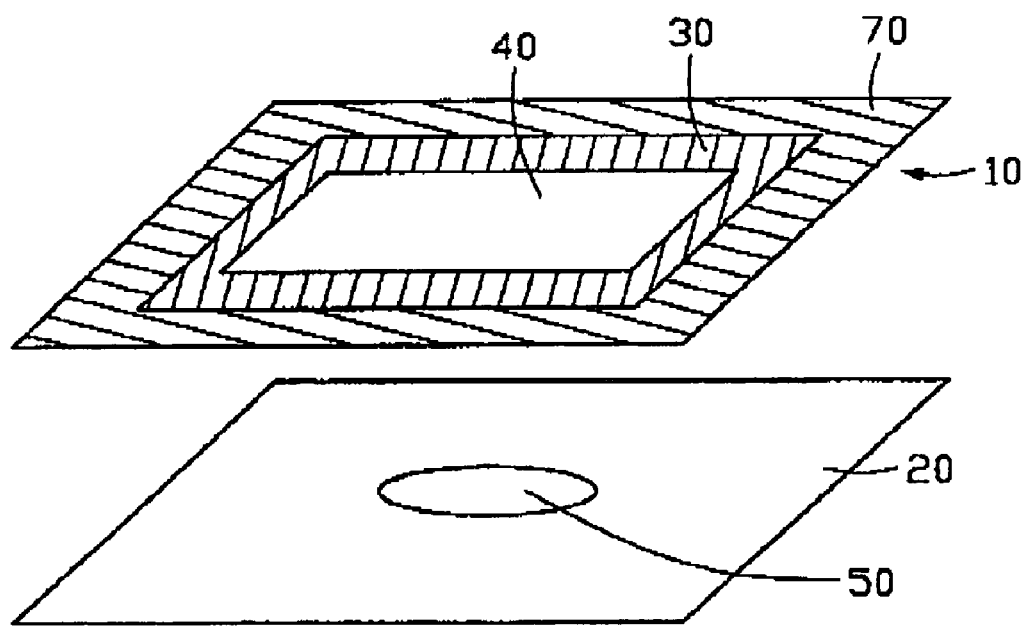
FIG. 9 is a simplified, schematic isometric view showing one stage in a conventional method for manufacturing a liquid crystal display panel.
Figure 10:
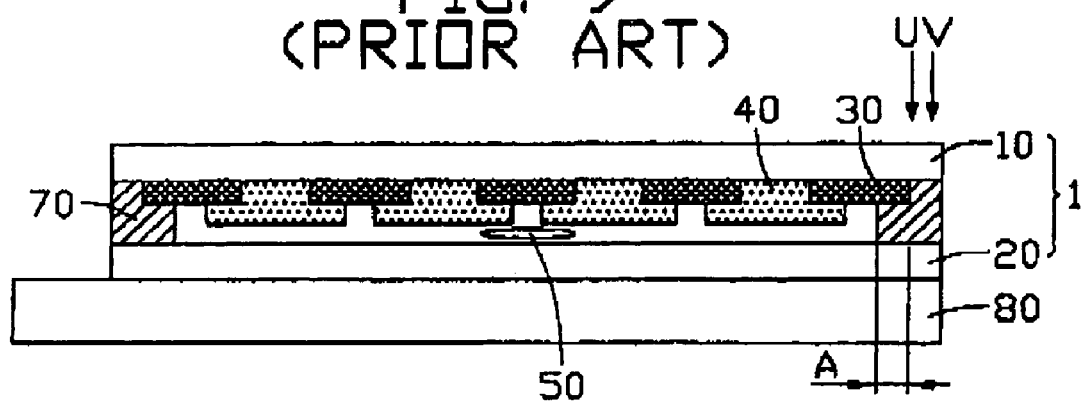
FIG. 10 is a schematic, side cross-sectional view showing another stage in the method of FIG. 9.

Referring to FIG. 7, in another exemplary embodiment of the present invention, the mask has n slits, where n is a natural number. A diffraction pattern is formed by using the n-slit mask. The diffraction pattern includes a main maxima portion 822. Light of the main maxima portion 822 of the diffraction light can be used to cure the sealant. A peak light intensity of the main maxima portion 822 is n squared times a light intensity of the light of the original UV light source. In the curing process, a curing rate can therefore be improved compared with conventional methods. Contamination of the liquid crystal by the sealant can also be avoided.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for curing a sealant when sealing a liquid crystal display panel, the method comprising:
    providing the liquid crystal display panel with a sealant for sealing the liquid crystal display panel; and
    curing the sealant by applying light having a double-slit diffraction pattern obtained by using a mask having two slits.

2. The method as claimed in claim 1, wherein the light is ultraviolet light.

3. A method for manufacturing a liquid crystal display panel, comprising:
    providing a first substrate, and forming a color filter film and a black matrix on the first substrate;
    providing a second substrate, and applying a sealant on the second substrate;

applying liquid crystal onto the second substrate;
attaching the first substrate to the second substrate; and
curing the sealant by applying light having a double-slit diffraction pattern obtained by using a mask having two slits.

4. The method as claimed in claim 3, wherein the light is ultraviolet light.

5. A method for manufacturing a liquid crystal display panel, comprising:

providing a first substrate and forming a color filter film and a black matrix on the first substrate;

providing a second substrate with a sealant applied thereon;

applying liquid crystal on the second substrate;

attaching the first substrate to the second substrate; and curing the sealant by applying light having a double-slit diffraction pattern obtained by using a mask having two slits.

6. The method as claimed in claim 5, wherein the light is ultraviolet light.

* * * * *